United States Patent [19]

Paek et al.

[11] Patent Number: 4,533,378
[45] Date of Patent: * Aug. 6, 1985

[54] MODIFIED ZIRCONIA INDUCTION FURNACE

[75] Inventors: Un C. Paek, West Windsor Township, Mercer County; Charles M. Schroeder, Jr., North Hanover Township, Burlington County, both of N.J.

[73] Assignee: AT&T Technologies, Inc., New York, N.Y.

[ * ] Notice: The portion of the term of this patent subsequent to May 22, 2001 has been disclaimed.

[21] Appl. No.: 383,066

[22] Filed: May 28, 1982

[51] Int. Cl.³ .............................................. C03B 37/01
[52] U.S. Cl. ........................................ 65/3.12; 65/13; 219/10.49 R
[58] Field of Search ................... 65/13, 3.12; 422/241, 422/250; 423/348, 349, 350; 219/10.49 R

[56] References Cited

U.S. PATENT DOCUMENTS

| | | | |
|---|---|---|---|
| 3,328,143 | 6/1967 | Hicks, Jr. | 65/13 |
| 3,729,335 | 4/1973 | Domrachev et al. | 65/3.12 |
| 4,052,153 | 10/1977 | Borer et al. | 219/10.49 R |
| 4,055,391 | 10/1977 | Schmidt et al. | 219/10.49 R |
| 4,242,553 | 12/1980 | Berkman et al. | 219/10.49 R |
| 4,450,333 | 5/1984 | Adrejco et al. | 219/10.49 R |

FOREIGN PATENT DOCUMENTS 52-58549  5/1977  Japan ..................................... 65/3.12

Primary Examiner—S. Leon Bashore
Assistant Examiner—Michael K. Boyer
Attorney, Agent, or Firm—D. J. Kirk

[57] ABSTRACT

A high temperature induction furnace (10) for drawing lightguide fiber (52) from a silica preform (44) has an axially located tubular zirconium dioxide susceptor (34) therein. Prior to use, at least a portion of the inside surface of the susceptor (34) is coated with a vapor deposited silica "soot" (54). The silica soot (54) is then consolidated at an elevated temperature. Surprisingly, such a technique substantially eliminates migration of zirconium dioxide particles from the susceptor (34) to the preform (44) and/or the fiber 52 without deleteriously affecting the susceptor (34) and/or the operation of the furnace (10).

1 Claim, 3 Drawing Figures

MODIFIED ZIRCONIA INDUCTION FURNACE

TECHNICAL FIELD

The invention is directed to a furnace for heating a lightguide preform to an elevated temperature in order to draw a fiber therefrom.

BACKGROUND OF THE INVENTION

The development of low loss, high silica lightguide fiber over the last few years has led to the investigation of high temperature (e.g., approximately 2000° C.) heat sources, for the drawing of high strength fiber from a lightguide preform. Of the possible heat sources, the oxy-hydrogen torch, the $CO_2$ laser and a few induction and resistance furnaces have been employed for drawing the high silica fibers. The torch method, while inexpensive, cannot maintain a uniform diameter over long lengths of drawn fiber. The $CO_2$ laser provides the cleanest drawing atmosphere, but requires special optical designs to radially distribute the energy for drawing and is limited in power, while resistance furnaces require an inert protective atmosphere to prevent oxidation of the heating element.

An induction furnace is basically comprised of a hollow, centrally located, tubular susceptor surrounded by an insulating material. An induction coil surrounds the insulating material to provide an alternating electromagnetic field when energized. The field couples to the susceptor, elevating the temperature thereof, forming a hot zone therein. A glass lightguide preform is then introduced into the hot zone to reflow a portion thereof from which the lightguide fiber is drawn.

High temperature induction furnaces provide high thermal inertia, stability, and radially symmetric heating. Most induction furnaces, however, use graphite or refractory metallic susceptors which require the flowing of protective atmospheres during operation to remove contaminants migrating from the inside surface of the tube. As a result, such furnaces have limited susceptor life and have some degree of contamination in the furnace atmosphere.

One induction furnace designed to overcome the foregoing problems is described in an article entitled "A Zirconia Induction Furnace For Drawing Precision Silica Wave Guides" by R. B. Runk in the *Optical Fiber Transmission II* technical digest (Tu B5-1), Feb. 22-24, 1977 which is incorporated by reference herein. That furnace uses a cylindrical susceptor made of yttria stabilized zirconium dioxide. The susceptor has a long life expectancy and minimal furnace atmosphere contamination in an oxygen-bearing atmosphere. Such a furnace has been shown to be most effective in drawing lightguide fiber from a preform. However, it has been found that after extended use microscopic particles of zirconium dioxide migrate from the susceptor onto the preform and/or the fiber being drawn from the lightguide preform. The zirconium dioxide particles substantially weaken the drawn fiber resulting in unacceptable product.

Accordingly, there is a need for a long life, high temperature induction furnace that is substantially contaminant-free during the drawing process in order to produce high strength fibers.

SUMMARY OF THE INVENTION

The foregoing problems have been overcome by an induction furnace for heating a lightguide preform to an elevated temperature in order to draw a fiber therefrom. The furnace is comprised of a housing; a tubular heating element located within said housing; and a thin coating of the lightguide preform material on at least a portion of the inside surface of the heating element.

DETAILED DESCRIPTION

Figure 1:
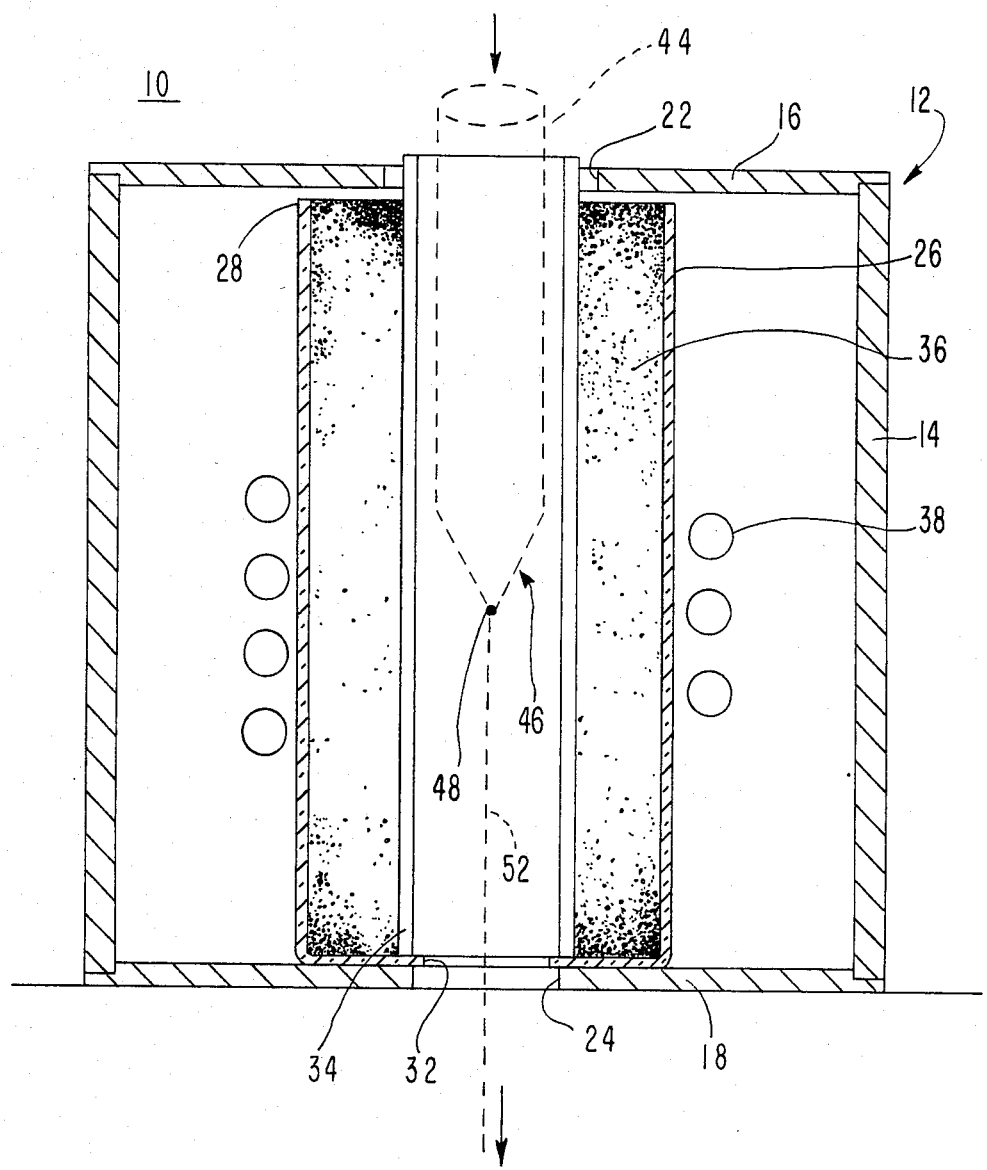
FIG. 1 is a cross-sectional view of a prior art induction heating furnace.

FIG. 1 depicts a prior art high temperature induction furnace generally referred to by the numeral 10. The furnace 10 is comprised of a cylindrical housing 12 having a sidewall 14, a top portion 16 and a bottom portion 18. The top portion 16 has a central opening 22 therein which is vertically aligned with an opening 24 in the bottom portion 18. A silica beaker 26, open at the top 28 has a circular aperture 32 in the bottom surface thereof which is axially aligned with the openings 22 and 24. A tubular susceptor 34 is centrally located within the beaker 26. The annular volume between the inside surface of the beaker 26 and the outer surface of the tubular susceptor 34 is filled with a zirconium insulating grain 36. An RF induction coil 38, of circular or rectangular cross section, connected to a power source (not shown) is mounted about the beaker 26. The housing 12 is made of copper or the like which is water cooled and acts as a shield to reduce stray radio-frequency fields. The susceptor 34 is 8 weight per cent yttria stabilized zirconium, composition 1372 of Zircoa Company, Solon, Ohio.

The low temperature resistivity of the zirconium dioxide susceptor 34 ($>10^4$ ohm-cm at room temperature) is too high to directly couple to the alternating electromagnetic field of the activated RF coil 38. For this reason, the zirconium dioxide susceptor 34 is preheated by coupling the field to a carbon rod (not shown), axially inserted therein, at room temperature. Above 1000° C. the susceptor 34 begins to couple to the electromagnetic field, and by approximately 1400° C. the carbon rod can be withdrawn without thermally shocking the susceptor.

By this method the temperature of the furnace 10 is raised to the operating temperature in approximately 60 minutes. During operation, the temperature of the zirconium susceptor 34 is monitored and controlled with an infrared pyrometer (not shown) to within ±2° C. of the desired set point. Fiber drawing temperatures normally used are between 1900° C. and 2300° C. depending upon the size of the preform 44 and the fiber drawing velocity. At these temperatures typically 7 kilowatts of power are required for maintaining a steady state operation. Frequencies on the order of about 4 megahertz are required for efficient operation at those temperatures. The RF field does not couple to the grain 36 which is large particle sized and coarse grained. Thus, the grain 36 acts as an insulator to maintain an elevated temperature within the susceptor 34 during operation. The grain 36 is electrically fused zirconium dioxide (−8 to 14 mesh) manufactured by TAM Ceramics, Niagara Falls, N.Y.

Once the temperature within the susceptor 34 has reached the desired level (e.g., 2000° C.), a solid, substantially cylindrical silica lightguide preform 44 (shown in phantom) is axially inserted therein until a first end 46 thereof is positioned at a "hot zone" which is located centrally in the susceptor within the RF coil 38. The elevated temperature heats the preform 44 to reflow a small volume 48 at the end thereof from which a lightguide fiber 52 is drawn.

Although such a technique has been most effective, after a period of time it has been found that very small particles of zirconium dioxide have deposited on the preform 44 and/or the fiber 52. Such particles are then drawn into and contaminate the lightguide fiber 52. Such contamination results in low strength fiber and substantially decreases fiber production yields. It is widely believed that the small zirconium dioxide particles emanate from microcracks formed in the susceptor 34 at elevated temperatures.

Figure 2:
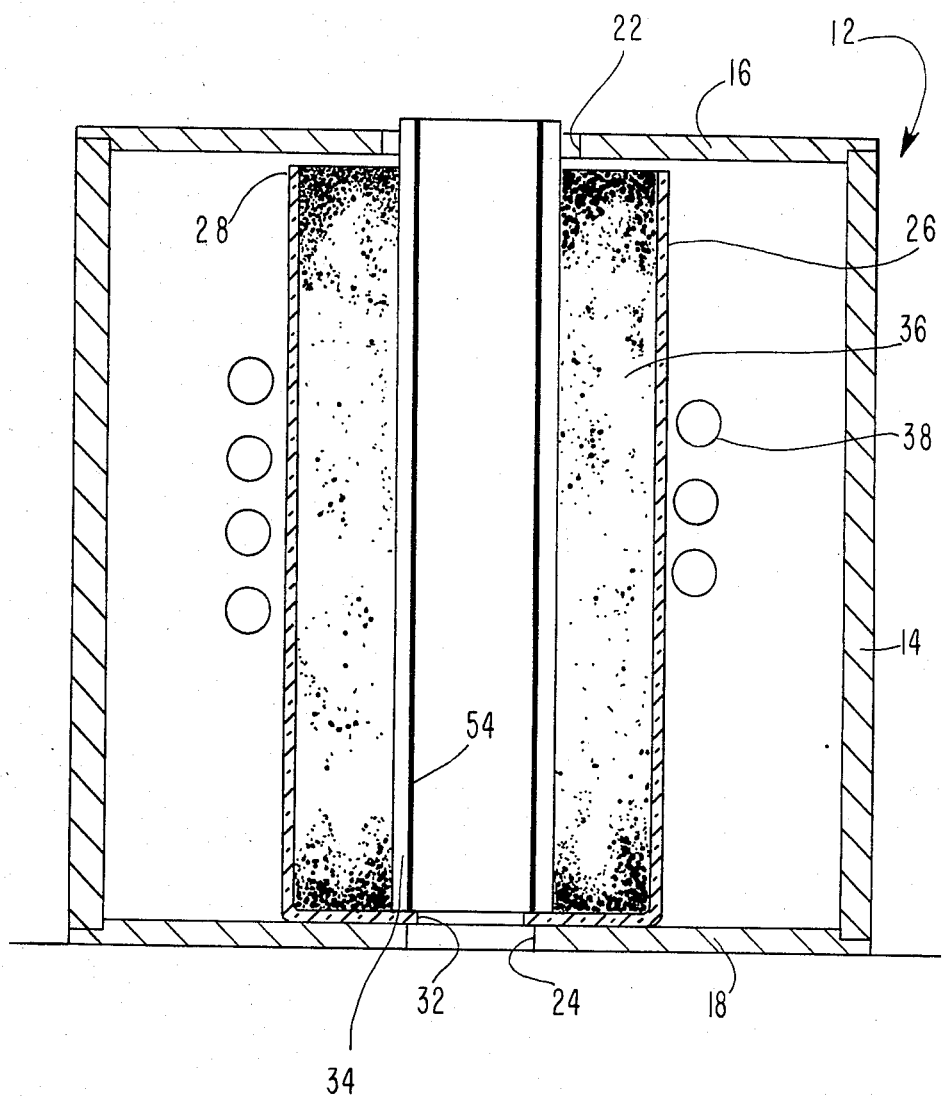
FIG. 2 is a cross-sectional view of a first embodiment of the instant induction heating furnace.

The instant invention overcomes the foregoing problem by depositing a thin layer of a soot 54 of the same material (e.g., $SiO_2$) as that of the solid preform 44 onto the inside surface of the susceptor 34 prior to assembling the furnace 10. The susceptor 34 is then placed inside the furnace 10 as shown in FIG. 2 and the coil 38 activated to form the centralized hot zone within the susceptor having an elevated temperature about 2000° C. which causes a portion of the preform 44 to reflow after consolidating the previously deposited soot 54. The fiber 52 is then drawn from the reflowing portion 48 of the preform 44 as previously described in reference to FIG. 1. The drawn fiber 52 has been found to have substantially higher strength and a greater production yield than fibers drawn in furnaces 10 having uncoated susceptors 34. Alternatively, the susceptor 34 with the soot 54 thereon may be placed in a separate furnace and heated to a temperature of about 1700° C. to consolidate or sinter the soot. The susceptor 34 may then be removed and inserted in the induction furnace 10.

Although the mechanism is not fully understood it is believed that a portion of the consolidated soot 54 diffuses into microcracks in the susceptor 34 to (1) form a seal and (2) act as a bond. Additionally, a very thin layer of the consolidated soot 54 remains on the surface of the susceptor 34 which substantially precludes particles from leaving that surface and undesirably migrating to the preform 44. Advantageously, any of the deposited, consolidated soot 54 which may evaporate from the surface of the susceptor 34 will not affect the drawn fiber 52 in as much as both the preform 44 and the consolidated soot are the same material.

The concept of depositing the silica soot 54 ($SiO_2$) on the inside surface of the susceptor 34 would not readily occur to one skilled in the art for it would appear that a eutectic of the materials would be formed. Such a eutectic would undesirably affect the coupling efficiency of the electromagnetic field to the susceptor 34 resulting in lower and/or uncontrollable temperatures in the hot zone. Surprisingly, deposition and consolidating the silica soot 54 on the surface of the susceptor 34 did not deleteriously affect the operation of the furnace 10.

The soot 54 was deposited on the inside surface of the susceptor 34 by rotating the susceptor on a lathe while directing a soot deposition torch therein. Once the desired thickness (e.g., 1 to 2 mm) was deposited the soot deposition torch was shut off and the coated susceptor 34 placed in a furnace as hereinbefore indicated.

Figure 3:
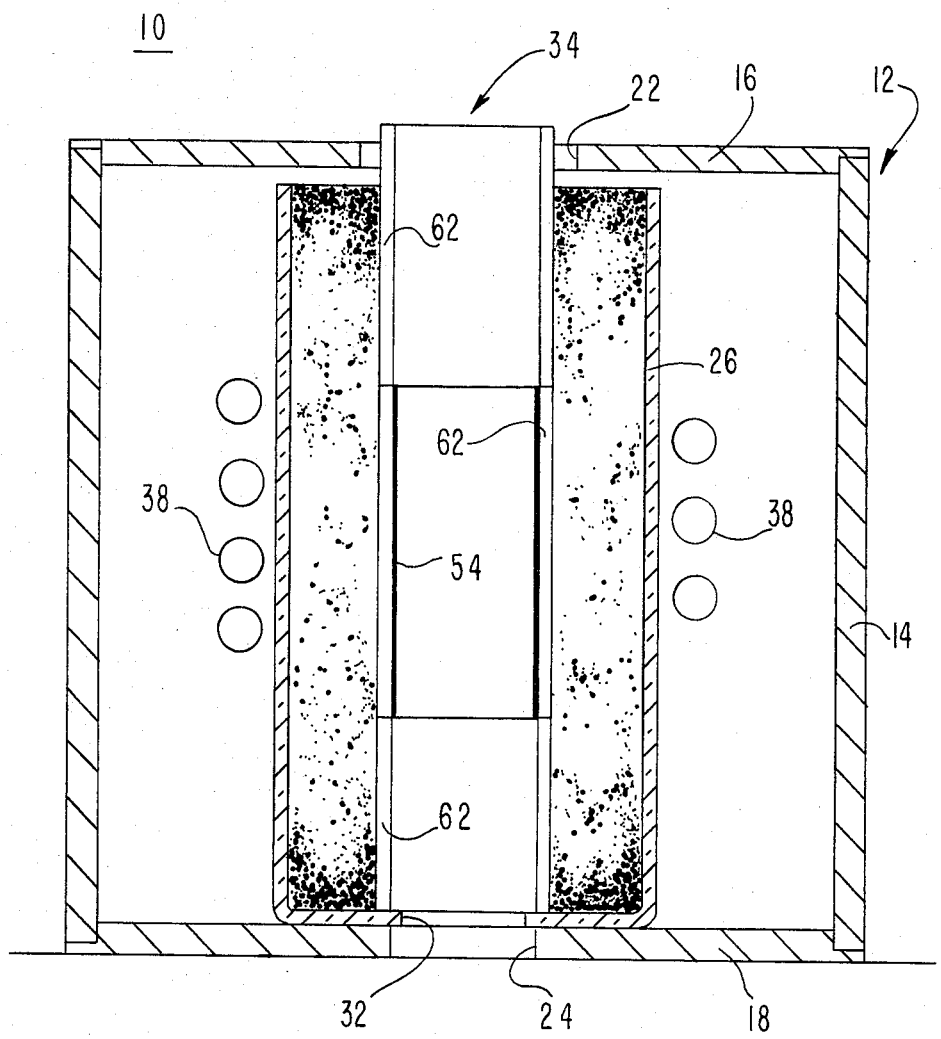
FIG. 3 is a cross-sectional view of a second embodiment of the instant induction heating furnace.

In an alternative embodiment, shown in FIG. 3, the susceptor 34 is comprised of a plurality of stacked susceptor tubes 62—62. Only the middle susceptor tube 62 has the coating of soot 54 applied to the inner surface thereof which is then consolidated as hereinbefore set forth. The central location of the middle tube 62 substantially corresponds to the "hot zone" in which a portion of the preform 44 is caused to reflow in order for the fiber 52 to be drawn therefrom as shown in FIG. 1. Again, it has been found that such a coating substantially eliminates zirconium dioxide particles from migrating to the preform 44.

It is to be understood that the embodiments described herein are merely illustrative of the principles of the invention. Various modifications may be made thereto by persons skilled in the art which will embody the principles of the invention and fall within the spirit and scope thereof. For instance, although an induction heating furnace has been described, the inventive concepts could be advantageously used in other furnaces (e.g., resistance) having centrally located tubular heating elements (i.e., muffles).

What is claimed is:

1. A method of preventing particles from migrating from the surface of a tubular zirconium dioxide susceptor onto a lightguide fiber being drawn from a preform axially located within said susceptor, comprising the steps of:

vapor depositing a thin porous layer of silica soot on the inside surface of the zirconium dioxide susceptor; and activating a high frequency induction coil, surrounding the susceptor, to heat said susceptor to consolidate the soot layer to form a thin fused silica layer on the inside surface of the susceptor to prevent particles from migrating therefrom.

* * * * *